Aug. 20, 1929.  G. E. STEVENS  1,725,680

CONSTRUCTION FOR VESSELS

Original Filed Oct. 2, 1926

G. E. Stevens
INVENTOR

BY Victor J. Evans
ATTORNEY

WITNESS:

Patented Aug. 20, 1929.

1,725,680

UNITED STATES PATENT OFFICE.

GOLDER E. STEVENS, OF MADILL, OKLAHOMA.

CONSTRUCTION FOR VESSELS.

Application filed October 2, 1926, Serial No. 139,139. Renewed January 16, 1929.

My present invention has reference to vessels of any type in which water or like liquids is to be heated, and my object is to provide such utensils with means whereby the contents thereof may be brought more quickly to the boiling point than now obtained in the present construction of such vessels.

To the attainment of the above broadly stated object and many others which will appear as the nature of the invention is better understood, the improvement consists in the construction, combination and operative association of parts, a satisfactory embodiment of which is shown by the accompanying drawings.

Figure 1:
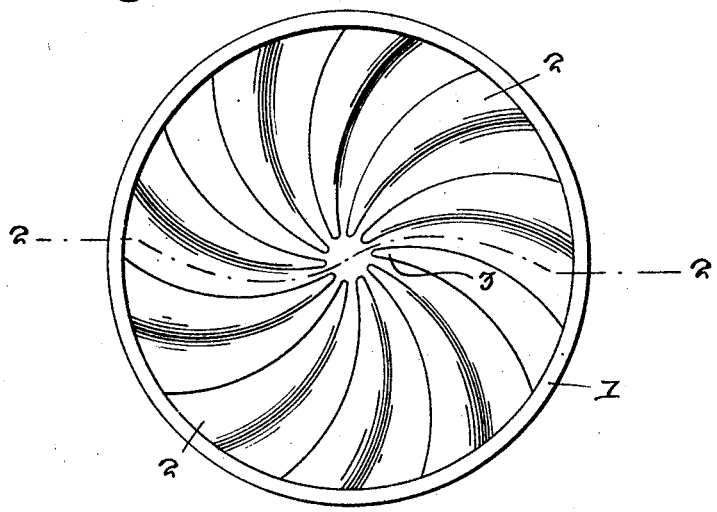
Figure 1 is a top plan view in accordance with this invention.
Figure 2:
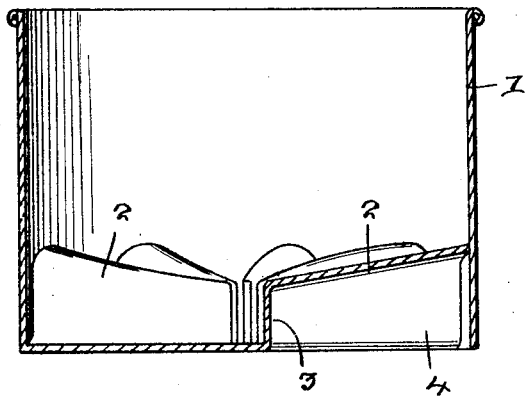
Figure 2 is a sectional view on the line 2—2 of Figure 1.
Figure 3:
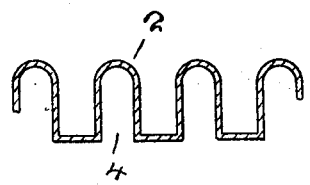
Figure 3 is a detail sectional view through the corrugated bottom of the vessel.

In the drawings I have illustrated a vessel 1, which is round in plan. The bottom of the vessel is corrugated in a particular and peculiar manner to best insure the concentration of heat against the bottom and the circulation of fluid in the bottom of the vessel to most effectively bring such fluid to the boiling point.

From points adjacent the center the bottom of the vessel is formed with channeled ribs 2. The ribs radiate from the center of the vessel to the sides thereof, the hollow ribs being connected to the sides and the outer ends of the ribs, that is the ends of the ribs at the center of the vessel, are closed. These ribs not only radiate from a point close to the center of the vessel but have their upper walls inclined upwardly from their inner to their outer ends. In addition to this it will be noted, especially by reference to Figure 1 of the drawings that the ribs 2 are curved and that the said ribs gradually increase in width from their closed ends 3 to the ends thereof which are connected to the sides of the vessel. By this arrangement it will be noted that the channels 4, provided by the ribs, will receive therein a greater amount of flame or heat units than were the ribs of the same cross sectional size throughout and by curving the ribs the heat delivered into the channels 4 will more effectively act upon the fluid in the wells between the ribs so that the fluid in the vessel will be brought to a boiling point in a quicker manner and with a less expenditure that is required with the ordinary construction of such vessels.

Having described the invention, I claim:—

A vessel having a corrugated bottom defining outer heat receiving spaces and inner fluid receiving wells, said corrugations being arranged radially from points equidistant from the center of the bottom of the vessel and having their top portions inclined upwardly from their inner to their outer closed ends, said corrugations being struck at curvatures and being gradually widened from their inner to their outer ends, which latter are connected to the sides of the vessel, and the wells between the corrugations being likewise widened from the center to the sides of the vessel.

In testimony whereof I affix my signature.

GOLDER E. STEVENS.